United States Patent [19]
Nakata et al.

[11] Patent Number: 5,444,211
[45] Date of Patent: Aug. 22, 1995

[54] LASER BEAM MACHINE FOR CUTTING A WORKPIECE USING MULTIPLE MACHINE CONDITIONS

[75] Inventors: Yoshinori Nakata; Atsushi Mori, both of Minamitsuru, Japan

[73] Assignee: Fanuc, Ltd., Yamanashi, Japan

[21] Appl. No.: 190,127

[22] PCT Filed: Jun. 22, 1993

[86] PCT No.: PCT/JP93/00848

§ 371 Date: Feb. 3, 1994

§ 102(e) Date: Feb. 3, 1994

[87] PCT Pub. No.: WO94/00271

PCT Pub. Date: Jan. 6, 1994

[30] Foreign Application Priority Data

Jun. 24, 1992 [JP] Japan .................. 4-165672

[51] Int. Cl.6 .............................................. B23K 26/00
[52] U.S. Cl. ............................. 219/121.67; 219/121.61; 364/474.08
[58] Field of Search ................. 219/121.67, 121.69, 219/121.84, 121.71, 121.61; 364/474.08

[56] References Cited

U.S. PATENT DOCUMENTS

| | | | |
|---|---|---|---|
| 4,914,599 | 4/1990 | Seki et al. ................. | 364/474.08 |
| 4,937,422 | 6/1990 | Nagamine et al. ............ | 364/474.08 |
| 4,945,207 | 7/1990 | Arai ........................ | 219/121.84 |
| 5,012,069 | 4/1991 | Arai ........................ | 364/474.08 |
| 5,252,805 | 10/1993 | Nakata et al. .............. | 219/121.61 |

FOREIGN PATENT DOCUMENTS

| | | | |
|---|---|---|---|
| 5662690 | 5/1981 | Japan ....................... | 219/121.67 |
| 57-177895 | 11/1982 | Japan . | |
| 60-137585 | 7/1985 | Japan . | |
| 61-219492 | 9/1986 | Japan . | |
| 2-30388 | 1/1990 | Japan . | |
| 2-137683 | 5/1990 | Japan ....................... | 219/121.61 |
| 3-216290 | 9/1991 | Japan ....................... | 219/121.67 |
| 3-221286 | 9/1991 | Japan ....................... | 219/121.61 |

*Primary Examiner*—Geoffrey S. Evans
*Attorney, Agent, or Firm*—Staas & Halsey

[57] ABSTRACT

A laser beam machine executes a cutting operation by irradiating a laser beam onto a workpiece. The cutting operation of nonferrous metals having a considerable thickness is executed effectively and stably. A piercing operation is executed at point A under machining condition A, forming an arc-shaped portion. Then, the machining condition A is changed to machining condition B to execute an enlargement processing, and the arc-shaped portion is extended as it is, forming an enlarged cutting groove. After the enlargement processing is completed at point B, the standoff (or distance from the tip end of a machining nozzle to the surface of the workpiece) is set to as short a distance as possible, and the machining condition is modified to machining condition C. Thus, a cutting operation is started according to machining condition C. Therefore, the cutting operation is executed in substantially the same state as that in which a cutting operation is started directly from the outer-side end of the workpiece. In addition, in the case where the cutting operation is executed, the assist gas pressure is set to a high value, and the standoff is set to a low value, so that dross scattering effect by the assist gas appears more remarkably. Thus, the cutting operation is executed effectively and stably.

6 Claims, 4 Drawing Sheets

FIG.5

| | | THICKNESS OF ALUMINUM (mm) | | | THICKNESS OF BRASS (mm) | | | THICKNESS OF STAINLESS STEEL (mm) | | |
|---|---|---|---|---|---|---|---|---|---|---|
| | | 1.0 | 2.0 | n.0 | 1.0 | 2.0 | n.0 | 1.0 | 2.0 | n.0 |
| MACHINING CONDITION A | PEAK OUTPUT S (kw) | $S_{11x}$ | $S_{12x}$ | $S_{1nx}$ | $S_{11y}$ | $S_{12y}$ | $S_{1ny}$ | $S_{11z}$ | $S_{12z}$ | $S_{1nz}$ |
| | FREQUENCY P (Hz) | $P_{11x}$ | $P_{12x}$ | $P_{1nx}$ | $P_{11y}$ | $P_{12y}$ | $P_{1ny}$ | $P_{11z}$ | $P_{12z}$ | $P_{1nz}$ |
| | DUTY RATIO Q (%) | $Q_{11x}$ | $Q_{12x}$ | $Q_{1nx}$ | $Q_{11y}$ | $Q_{12y}$ | $Q_{1ny}$ | $Q_{11z}$ | $Q_{12z}$ | $Q_{1nz}$ |
| | STANDOFF L (mm) | 2.0 | | | 2.0 | | | 2.0 | | |
| | ASSIST GAS PRESSURE GP (kg/cm²) | 2.0 | | | 2.0 | | | 2.0 | | |
| | KIND OF ASSIST GAS GA | OXYGEN | | | OXYGEN | | | OXYGEN | | |
| | PIERCING PRESET TIME R (sec) | $R_{11x}$ | $R_{12x}$ | $R_{1nx}$ | $R_{11y}$ | $R_{12y}$ | $R_{1ny}$ | $R_{11z}$ | $R_{12z}$ | $R_{1nz}$ |
| | NUMBER | $A_{11}$ | $A_{12}$ | $A_{1n}$ | $B_{11}$ | $B_{12}$ | $B_{1n}$ | $S_{11}$ | $S_{12}$ | $S_{1n}$ |
| MACHINING CONDITION B | PEAK OUTPUT S (kw) | $S_{21x}$ | $S_{22x}$ | $S_{2nx}$ | $S_{21y}$ | $S_{22y}$ | $S_{2ny}$ | $S_{21z}$ | $S_{22z}$ | $S_{2nz}$ |
| | FREQUENCY P (Hz) | $P_{21x}$ | $P_{22x}$ | $P_{2nx}$ | $P_{21y}$ | $P_{22y}$ | $P_{2ny}$ | $P_{21z}$ | $P_{22z}$ | $P_{2nz}$ |
| | DUTY RATIO Q (%) | $Q_{21x}$ | $Q_{22x}$ | $Q_{2nx}$ | $Q_{21y}$ | $Q_{22y}$ | $Q_{2ny}$ | $Q_{21z}$ | $Q_{22z}$ | $Q_{2nz}$ |
| | STANDOFF L (mm) | 2.0 | | | 2.0 | | | 2.0 | | |
| | ASSIST GAS PRESSURE GP (kg/cm²) | 2.0 | | | 2.0 | | | 2.0 | | |
| | KIND OF ASSIST GAS GA | OXYGEN | | | OXYGEN | | | OXYGEN | | |
| | CUTTING SPEED F (mm/min) | $F_{21x}$ | $F_{22x}$ | $F_{2nx}$ | $F_{21y}$ | $F_{22y}$ | $F_{2ny}$ | $F_{21z}$ | $F_{22z}$ | $F_{2nz}$ |
| | CONTINUOUS DISTANCE (mm) OR TIME H (sec) | $H_{21x}$ | $H_{22x}$ | $H_{2nx}$ | $H_{21y}$ | $H_{22y}$ | $H_{2ny}$ | $H_{21z}$ | $H_{22z}$ | $H_{2nz}$ |
| | NUMBER | $A_{21}$ | $A_{22}$ | $A_{2n}$ | $B_{21}$ | $B_{22}$ | $B_{2n}$ | $S_{21}$ | $S_{22}$ | $S_{2n}$ |
| MACHINING CONDITION C | PEAK OUTPUT S (kw) | $S_{31x}$ | $S_{32x}$ | $S_{3nx}$ | $S_{31y}$ | $S_{32y}$ | $S_{3ny}$ | $S_{31z}$ | $S_{32z}$ | $S_{3nz}$ |
| | FREQUENCY P (Hz) | $P_{31x}$ | $P_{32x}$ | $P_{3nx}$ | $P_{31y}$ | $P_{32y}$ | $P_{3ny}$ | $P_{31z}$ | $P_{32z}$ | $P_{3nz}$ |
| | DUTY RATIO Q (%) | $Q_{31x}$ | $Q_{32x}$ | $Q_{3nx}$ | $Q_{31y}$ | $Q_{32y}$ | $Q_{3ny}$ | $Q_{31z}$ | $Q_{32z}$ | $Q_{3nz}$ |
| | STANDOFF L (mm) | 0.5 | | | 0.5 | | | 0.5 | | |
| | ASSIST GAS PRESSURE GP (kg/cm²) | 9.9 | | | 6.0 | | | 9.9 | | |
| | KIND OF ASSIST GAS GA | AIR | | | NITROGEN | | | NITROGEN(AIR) | | |
| | CUTTING SPEED F (mm/min) | $F_{31x}$ | $F_{32x}$ | $F_{3nx}$ | $F_{31y}$ | $F_{32y}$ | $F_{3ny}$ | $F_{31z}$ | $F_{32z}$ | $F_{3nz}$ |
| | NUMBER | $A_{31}$ | $A_{32}$ | $A_{3n}$ | $B_{31}$ | $B_{32}$ | $B_{3n}$ | $S_{31}$ | $S_{32}$ | $S_{3n}$ |

LASER BEAM MACHINE FOR CUTTING A WORKPIECE USING MULTIPLE MACHINE CONDITIONS

FIELD OF THE INVENTION

The present invention relates to a laser beam machine which executes a cutting operation by irradiating a laser beam onto a workpiece. In particular, the present invention relates to a laser beam machine wherein the material of workpiece is made of aluminum, brass, stainless steel and alloys of those, and an inert gas other than oxygen or an air is used as an assist gas to execute the cutting operation.

DESCRIPTION OF THE RELATED ART

Laser beam machines have been widely used for cutting metal. When metal is made of nonferrous metals such as aluminum, brass, or stainless steel, the machining condition for executing the cutting operation is modified when piercing the metal at the cutting start point, and when the cutting operation is executed. For example, an oxygen gas is used as an assist gas in piercing; on the other hand, an inert gas such as nitrogen gas is used as an assist gas in cutting.

However, these nonferrous metals are made of materials which are very difficult to be cut for the following reasons.

(1) These nonferrous metals have high reflectance with respect to a carbondioxide laser beam of a wavelength 10.6 μm of; for this reason, piercing is difficult to execute at the cutting start point.

(2) It is difficult to readily remove dross (mass of melted metals) gathering at the lower portion of the cutting groove in a cutting operation.

(3) An inert gas or air is used as an assist gas in the cutting operation; for this reason, the depth of the cutting groove narrows.

These disadvantages make executing a cutting operation of nonferrous metals such as aluminum effectively and stably impossible, and cause cutting defects to occur frequently. For example, in the case where the cutting operation is executed by using a carbondioxide laser beam having an output of 3.0 KW, the limiting thickness, the maximum thickness at which machining can be stably executed regardless of the kind of material, is about 5 mm.

Particularly, the aforesaid cutting defects occur frequently when the operation is transferred from piercing to cutting at the machining start point. The thicker the material is, the more remarkably the aforesaid tendency appears. This results from the following reasons: an inert gas or air is mainly used as an assist gas in the cutting operation; for this reason, the cutting groove depth is narrow, and this influence is greatly shown when the operation is transferred from piercing to cutting.

On the other hand, in the case where the cutting operation is started directly from the outer-side end of the workpiece without executing a piercing operation at the machining start point, it has been found from experience that a workpiece having considerable thickness can be stably cut.

SUMMARY OF THE PRESENT INVENTION

The present invention has been made in view of such a situation. An object of the present invention is to provide a laser beam machine which effectively and stably executes an operation for cutting nonferrous metals, such as aluminum, having a considerable thickness.

To solve the above problems, the present invention provides a laser beam machine which executes a cutting operation by irradiating a laser beam onto a workpiece. The laser beam machine of the present invention comprises piercing command means which executes a piercing operation at the machining start point of the aforesaid cutting operation according to a first machining condition, an enlargement processing command unit which executes an enlargement processing for enlarging a depth of a cutting groove directly after the aforesaid piercing operation is completed, according to a second machining condition, and a cutting command unit which executes a cutting operation after the aforesaid enlargement processing of the depth of the cutting groove is completed, according to a third machining condition.

The piercing command unit executes a piercing operation at the cutting start point according to the first machining condition. The enlargement processing command unit executes the enlargement processing of the depth of the cutting groove directly after the piercing operation is executed, according to the second machining condition. The cutting command unit executes the cutting operation after the enlargement processing of the depth of the cutting groove is completed, according to the third machining condition.

In other words, the enlargement processing for enlarging the depth of the cutting groove is executed directly after the piercing operation is executed at the machining start point. The cutting operation is started after the enlargement processing is completed. Therefore, the cutting operation is executed in substantially the same state as that in which a cutting operation is started directly from the outer-side end of the workpiece. Thus, the cutting operation can be executed effectively and stably, and workpieces having a considerable thickness can be readily cut. Thusly, a desired cutting is performed.

BRIEF DESCRIPTION OF THE DRAWINGS

FIG. 5 is a table showing machining conditions.

DETAILED DESCRIPTION OF THE PRESENT INVENTION

One embodiment of the present invention is described below with reference to the drawings.

Figure 2:
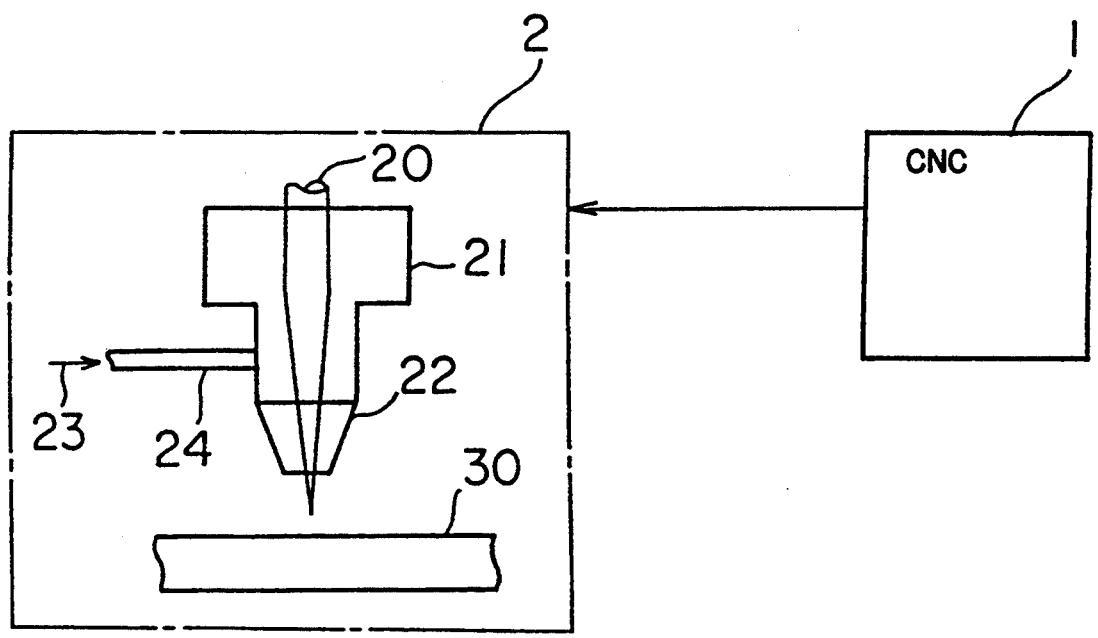
FIG. 2 is a block diagram schematically showing a configuration of a laser beam machine according to the present invention.

FIG. 2 is a block diagram schematically showing a configuration of a laser beam machine according to the present invention. In the figure, the laser beam machine comprises a CNC (Numerical Control Device) 1 and a machine body 2. The CNC 1, which is constituted as a processor being a main part, gives piercing, enlargement processing and cutting commands to the machine body 2, and controls an operation of the machine body 2. The details thereof are described hereinafter.

In the machine body 2, a laser beam 20 is emitted from a laser oscillator (not shown) in accordance with the command from the CNC 1. The laser beam 20 is irradiated onto a workpiece 30 from a machining nozzle 22 through a machining head 21. An assist gas 23 from a gas bomb (not shown) is guided into the machining head 21 through a gas guiding inlet 24, and is then supplied from the machining nozzle 22 to the workpiece 30. On the surface of the workpiece 30, a thermal and chemical reaction is caused by the laser beam 20 and the assist gas 23, thereby performing a cutting operation on the workpiece 30. In this case, the workpiece 30 is made of nonferrous metals (such as aluminum, brass, and alloys of those) and ferrous metal (such as stainless steel).

Figure 3:
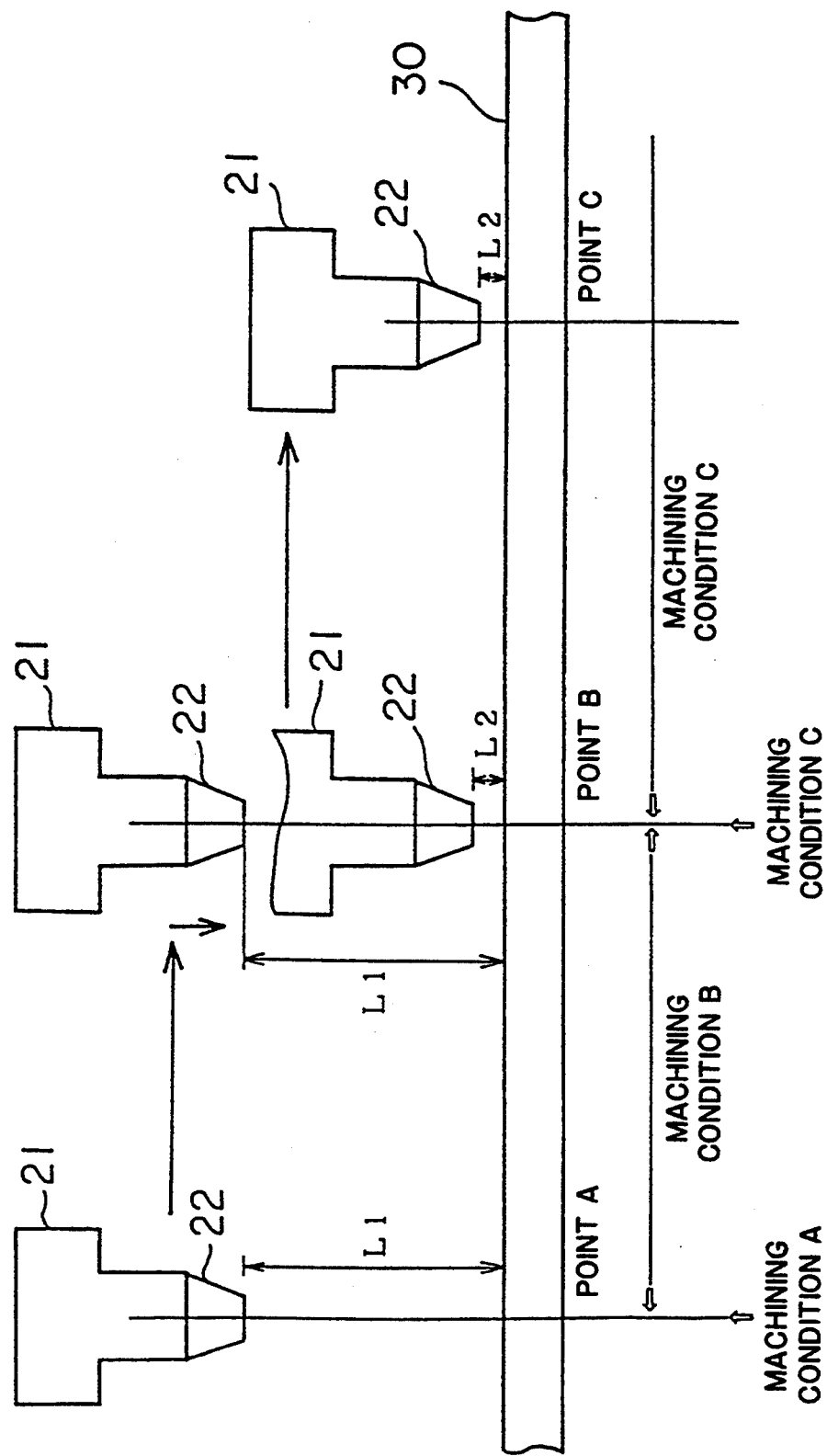
FIG. 3 is a view showing the procedures of cutting operation according to the present invention.

FIG. 3 is a view showing the procedures of the cutting operation according to the present invention. To cut the workpiece 30, piercing is, first, executed at the machining start point, namely at point A. Then, the enlargement processing is executed between the points A and B. The standoff L (distance from the tip of the machining nozzle 22 to the surface of the workpiece 30) at this point A and between the points A and B, is set to a relatively long distance L1 (for example, 2 mm). On the other hand, standoff L at the point B is modified to as short a distance L2 (for example, 0.5 mm) as possible. A cutting operation is started when the standoff reaches L2. The aforesaid piercing at the point A, enlargement processing between the points A and B, and cutting after the point B are executed according to machining conditions A, B and C, respectively. The details of these machining conditions are described hereinafter.

Figure 1:
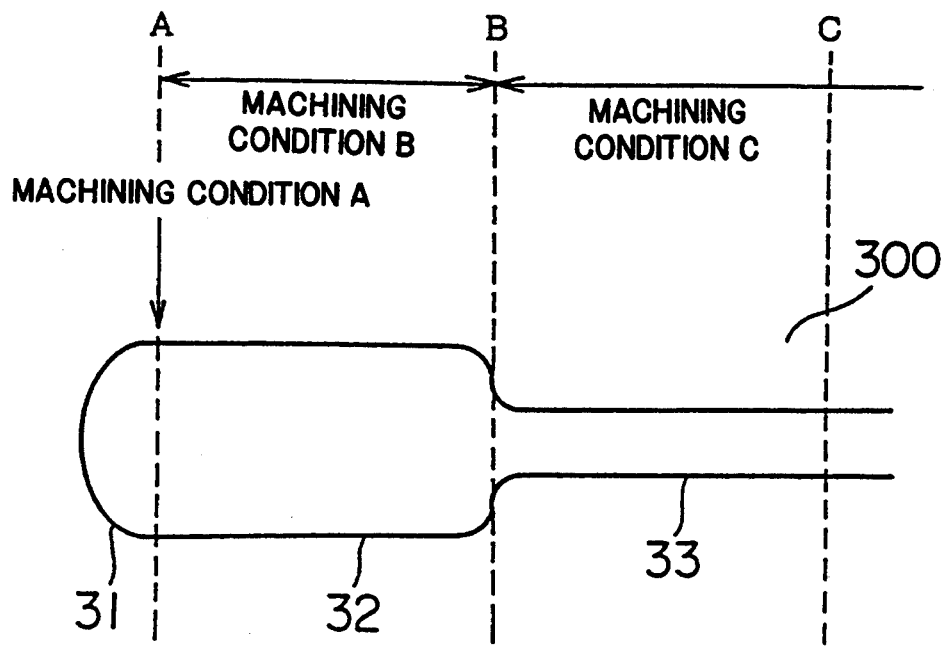
FIG. 1 is a view showing a state in which the depth of a cutting groove is changed.

FIG. 1 is a view showing a state in which the depth of the cutting groove is changed. In FIG. 1, a cutting groove 300 is a machining groove viewing the workpiece 30 from the top. At point A, piercing is executed according to machining condition A, thus forming an arc-shaped portion 31. After this piercing is completed, the machining condition is changed to machining condition B, and the enlargement processing is executed. As a result, an enlarged cutting groove 32, which has a shape such that the arc-shaped portion 31 is extended as it is, is formed. After the enlargement processing is completed at point B, the standoff L is set to the shortest possible distance L2 while the machining condition is changed to machining condition C, thus the cutting operation is started. At that time, the depth of a cutting groove 33 is decreased from the enlargement processing groove 32, and is kept constant.

Figure 4:
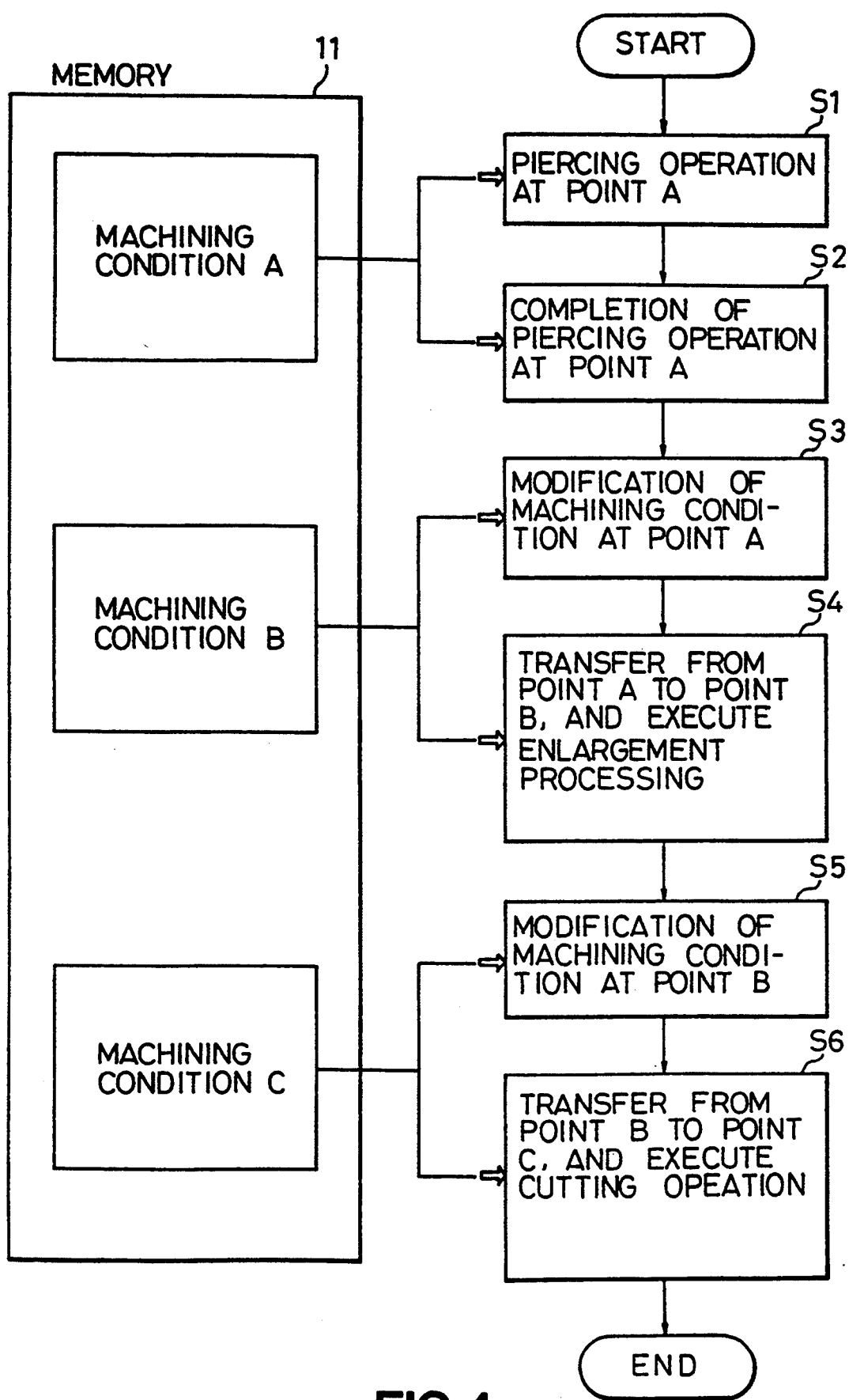
FIG. 4 is a flowchart for executing the cutting operation according to the present invention.

FIG. 4 shows a flowchart for executing the cutting operation according to the present invention. In FIG. 4, numerals next to S denote step numbers.

[S1] Piercing is executed at point A. This piercing operation is executed according to machining condition A previously stored in a memory 11.

[S2] The piercing at point A is complete. The completion of the piercing is detected by counting time set in machining condition A. Alternatively, a sensor for detecting reflecting light is located at point A, and the completion is detected according to a piercing completion signal fetched by the aforesaid sensor.

[S3] The machining condition A is modified to machining condition B at the point A. Incidentally, machining condition B is previously stored in memory 11, like the aforesaid machining condition A.

[S4] The enlargement processing is executed according to machining condition B as the machining head is moved from the point A to the point B.

[S5] The enlargement processing is completed at point B, and machining condition B is modified to machining condition C. Incidentally, machining condition C is previously stored in memory 11, like the aforesaid machining conditions A and B.

[S6] The cutting operation is executed according to machining condition C as the machining head is moved from point B to point C.

FIG. 5 is a table showing machining conditions. In the table, machining conditions A, B and C are set for every material and thickness of the workpiece 30. Machining condition A is composed of items such as a peak output S, frequency P and duty ratio Q, which are regarded as an output command value of the laser beam, the standoff L, the assist gas pressure GP, the kinds of assist gases GA, and the piercing preset time R. Machining condition B is composed of items such as a peak output S, frequency P and duty ratio Q, which are regarded as an output command value of laser beam, the standoff L, the assist gas pressure GP, the kinds of assist gases GA, the cutting speed F, and the continuation distance or time H of enlargement processing. Machining condition C is composed of items such as a peak output S, frequency P and duty ratio Q, the standoff L, the assist gas pressure GP, the kinds of assist gases GA, and the cutting speed F.

Here, the standoff L, assist gas pressure GP and kinds of assist gases GA of these items are described below. The standoff L (in machining conditions A and B) in piercing and enlargement processing, is set to a relatively long distance (2 mm), as described above. Oxygen is used as the assist gas 23, and its gas pressure GP is set to a low value (2 Kg/cm$^2$). As is clear from the above explanation, an oxygen gas is used in piercing and enlargement processing operations, so that the workpiece 30 can be readily melted. As a result, piercing and enlargement processing operations can be readily executed. In addition, the standoff L is made long, so that reflecting light and spatters (scattering melted metals) can be prevented from flowing into the machining head 21 from the machining nozzle 22, thus protecting a condensing lens located in the machining head 21.

On the other hand, the standoff L (in machining condition C) in the cutting operation is set to the shortest possible distance (0.5 mm). An inert gas such as nitrogen, or air, is used as the assist gas 23, and its gas pressure GP is set to a high pressure (6.0 to 9.9 Kg/cm$^2$). As described above, the assist gas pressure GP is set high, and the standoff L is made as short as much as possible. Thus, a sufficient amount and pressure of an assist gas is supplied to the cutting groove 33 on the workpiece 30. Therefore, dross caused in the cutting groove 33 in the cutting operation is scattered by the assist gas 23, so that machining quality on a cut section of the workpiece can be greatly improved. Such a dross scattering effect appears more remarkably because the assist gas pressure GP is set to a high value, and the standoff L is made short.

As described above, when a cutting operation is executed on nonferrous metals such as aluminum, the cutting operation is not executed at once after piercing at the machining start point (point A) is executed, but an enlargement processing for enlarging the depth of the cutting groove is executed once, and the cutting operation is started after the enlargement processing is completed. Therefore, the cutting operation is executed in substantially the same state as that in which a cutting operation is started directly from the outer-side end of the workpiece. In addition, when the cutting operation is executed, the assist gas pressure GP is set to a high value, and the standoff L is set to a short value, so that a dross scattering effect by the assist gas appears more remarkably. Thus, the cutting operation can be executed effectively and stably.

As a result, when the cutting speed F is set to 250 mm/min, the allowable thickness of the workpiece 30, which is capable of executing machining operations from piercing to cutting without causing disadvantages, is 10 mm for aluminum, 8 mm for brass and 8 mm for stainless steel. Therefore, the cutting operation can be stably performed beyond the conventional limiting thickness 5 mm.

As described above, according to the present invention, when a cutting operation is executed on nonferrous metals such as aluminum, an enlargement processing for enlarging the depth of the cutting groove is executed directly after the piercing operation is executed at the machining start point, and the cutting operation is started after the enlargement processing is completed. Therefore, the cutting operation is executed in substantially the same state as that in which a cutting operation is started directly from the outer side of the end of workpiece. Thus; the cutting operation is executed effectively and stably, and workpieces having a considerable thickness can be readily cut, and a desired cutting performed.

We claim:

1. A laser beam machine executing a cutting operation by irradiating a laser beam onto a workpiece, said laser beam machine comprising:
    piercing command means for executing a piercing operation at a machining start point of said cutting operation according to a first machining condition;
    enlargement processing command means for executing enlargement processing for enlarging a depth of a cutting groove directly after said piercing operation is completed, according to a second machining condition; and
    cutting command means for executing a cutting operation after said enlargement processing of said depth of the cutting groove is completed, according to a third machining condition.

2. A laser beam machine according to claim 1, wherein said first machining condition comprises output command values of said laser beam, standoff, types and pressure of assist gases, and preset time.

3. A laser beam machine according to claim 1, wherein said second machining condition comprises output command values of said laser beam, standoff, types and pressure of assist gases, a cutting speed, and one of a position and a preset time, for modifying said second machining condition to said third machining condition.

4. A laser beam machine according to claim 1, wherein said third machining condition comprises output command values of said laser beam, standoff, types and pressure of assist gases, and a cutting speed.

5. A laser beam machine executing a cutting operation by irradiating a laser beam onto a workpiece, said laser beam machine comprising:
    piercing command means for executing a piercing operation at a machining start point of said cutting operation according to a first machining condition;
    enlargement processing command means for executing enlargement processing for enlarging a depth of a cutting groove directly after said piercing operation is completed, according to a second machining condition; and
    cutting command means for executing a cutting operation after said enlargement processing of said depth of the cutting groove is completed, according to a third machining condition,
    wherein the standoff in said third machining condition is set to a value smaller than a value of the standoff in said first machining condition and a value of the standoff in said second machining condition.

6. A laser beam machine executing a cutting operation by irradiating a laser beam onto a workpiece, said laser beam machine comprising:
    piercing command means for executing a piercing operation at a machining start point of said cutting operation according to a first machining condition;
    enlargement processing command means for executing enlargement processing for enlarging a depth of a cutting groove directly after said piercing operation is completed, according to a second machining condition; and
    cutting command means for executing a cutting operation after said enlargement processing of said depth of the cutting groove is completed, according to a third machining condition,
    wherein an assist gas used in said first machining condition and in said second machining condition is oxygen, and an assist gas used in said third machining condition is one of and inert gas and air.

* * * * *

UNITED STATES PATENT AND TRADEMARK OFFICE
CERTIFICATE OF CORRECTION

PATENT NO. : 5,444,211
DATED : August 22, 1995
INVENTOR(S) : Yoshinori NAKATA et al.

It is certified that error appears in the above-indentified patent and that said Letters Patent is hereby corrected as shown below:

Column 1, line 22, after "the" insert –subsequent–.

Column 2, line 8, before "piercing" (first occurrence) insert

–a– and change "means" to –unit–.

Column 5, line 25, "Thus;" should be –Thus,–; and line 28, after "cutting" insert –is–.

Signed and Sealed this

Fourteenth Day of November, 1995

Attest:

BRUCE LEHMAN

*Attesting Officer*    *Commissioner of Patents and Trademarks*